United States Patent [19]

Hammond et al.

[11] Patent Number: 5,012,121

[45] Date of Patent: Apr. 30, 1991

[54] ELECTRICAL POWER SUPPLY FOR SHORT TERM POWER INTERRUPTIONS

[75] Inventors: Russell E. Hammond, La Jolla; Robert L. Northup, San Diego, both of Calif.; Alan G. Shimp; Francis B. Fassnacht, both of Silver Spring, Md.

[73] Assignee: The United States of America as represented by the Secretary of the Navy, Washington, D.C.

[21] Appl. No.: 497,464

[22] Filed: Mar. 22, 1990

[51] Int. Cl.[5] .......................... H02J 9/06; H02M 3/06
[52] U.S. Cl. ...................................... 307/64; 307/87; 307/109
[58] Field of Search ....................... 307/64–66, 307/85–87, 109, 110; 320/3–5, 10

[56] References Cited

U.S. PATENT DOCUMENTS

| | | | |
|---|---|---|---|
| 4,238,690 | 12/1980 | Clarke | 307/66 |
| 4,395,639 | 7/1983 | Bring | 307/66 |
| 4,788,450 | 11/1988 | Wagner | 307/66 |
| 4,811,163 | 3/1989 | Fletcher | 307/64 |
| 4,882,665 | 11/1989 | Choi et al. | 307/110 |

FOREIGN PATENT DOCUMENTS

| | | | |
|---|---|---|---|
| 0005441 | 1/1977 | Japan | 307/66 |
| 0664257 | 5/1979 | U.S.S.R. | 307/64 |
| 0851640 | 8/1981 | U.S.S.R. | 307/64 |

Primary Examiner—A. D. Pellinen
Assistant Examiner—Richard T. Elms

Attorney, Agent, or Firm—Harvey Fendelman; Thomas Glenn Keough; Michael A. Kagan

[57] ABSTRACT

A direct current power supply for instantaneously providing tens of kilowatts of electrical energy for brief periods, such as 100 ms, during momentary power interruptions between a load and an electrical power source having a supply voltage includes a capacitor having an initial voltage charge preferably greater than the supply voltage. The cathode of a zener diode is operably coupled to the capacitor. The anode of a second diode is operably coupled to the anode of the zener diode. A solid state switch has a power input operably coupled between the capacitor and the cathode of the zener diode, a power output operably coupled between the anodes of the zener diode and second diode, and an enabling input, so that the switch may be triggered to conduct electrical power whereby voltage from the capacitor is conducted through the switch to the anode of the second diode when an enabling signal is provided to the enabling input. The anode of a third diode is operably coupled to the voltage supply, and the cathode of the third diode is connnected to the load. The cathode of the second diode is connected between the cathode of the third diode and the load. A low supply voltage detecting circuit operably coupled between the enabling input of the solid-switch and the supply voltage provides the enabling signal to trigger the switch into a conduction mode when the supply voltage is below a predetermined voltage level.

23 Claims, 7 Drawing Sheets

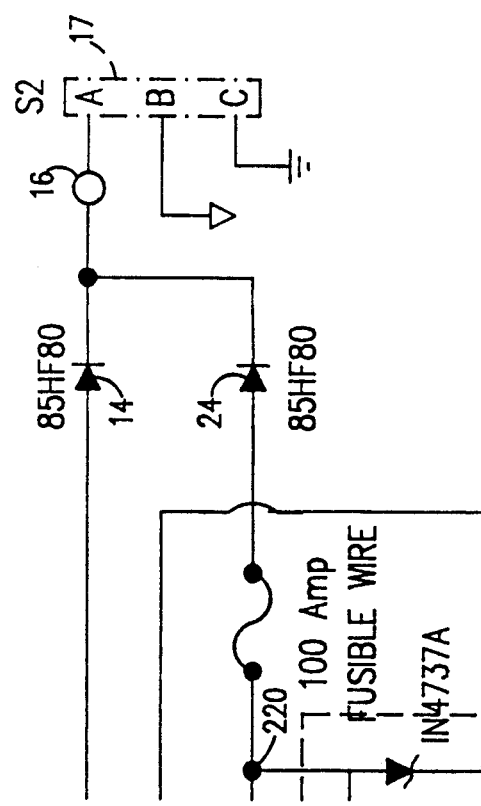

ELECTRICAL POWER SUPPLY FOR SHORT TERM POWER INTERRUPTION

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

The present invention relates to the field of power electronics, and more specifically to power supplies providing temporary electrical power to maintain uninterrupted electrical power to a load during momentary electrical power interruptions.

Many types of electrical systems, especially those on board ships of the U.S. Navy, require an uninterrupted electrical power supply. Continuity of electrical power can be critical to a ship's survival in a war-time situation. Power interruptions to critical shipboard loads may cause a loss of information which can result in degradation of offensive and defensive capabilities. Examples of shipboard systems especially vulnerable to intermittent power losses include computer, navigation, communication, and weapon guidance systems, i.e, virtually all digital electronic systems. Often, power restart can require a substantial period of time.

Battery powered uninterruptible power supplies may be used for long term power interruptions having durations which may vary from minutes to hours. However, these types of power supplies are not practical for momentary power interruptions (milliseconds) for applications requiring relatively large amounts of power, which may be on the order of 10 kw. A battery has a relatively large internal resistance which causes battery output voltage to drop substantially when a large current of short duration is drawn. Thus, many batteries may be required to be connected in parallel in order to instantaneously provide energy at the proper voltage level while avoiding the internal resistance problem. However, this results in a bulky system. Power supplies sometimes have extra output capacitance for energy storage, but generally can not store sufficient energy at their output voltage levels, which may be as low as 5 volts dc, typical of many digital applications. Therefore, there is a need for a physically compact DC electrical power supply which can instantaneously provide up to tens of kilowatts of electrical power for at least 100 ms in the event of power interruptions.

SUMMARY OF THE INVENTION

The present invention provides a direct current power supply for instantaneously providing tens of kilowatts of electrical energy for periods which may for example, be 100 ms, during momentary power interruptions between a load and an electrical power source having a supply voltage. The invention includes a capacitor having an initial voltage charge preferably greater than the supply voltage. The cathode of a zener diode is operably coupled to the capacitor. The anode of a second diode is operably coupled to the anode of the zener diode. A solid state switch has a power input operably coupled between the capacitor and the cathode of the zener diode, a power output operably coupled between the anodes of the zener diode and second diode, and an enabling input, so that the switch may be triggered to conduct electrical power so that voltage from the capacitor may be conducted through the switch to the anode of the second diode when an enabling signal is provided to the enabling input. The anode of a third diode is operably coupled to the voltage supply, and the cathode of the third diode is connected to the load. The cathode of the second diode is connected between the cathode of the third diode and the load. Enabling means operably coupled between the enabling input of the solid-state switch and the supply voltage provides the enabling signal to trigger the switch into a conduction mode when the supply voltage is below a predetermined voltage level.

Thus, an object of the present invention is to provide makeup electrical energy to compensate for momentary electrical line power interruptions. Another object of the present invention is to provide an electrical power source that can instantaneously provide up to tens of kilowatts of electrical power for periods which may be on the order of 100 milliseconds in the event of a momentary loss of electrical power.

BRIEF DESCRIPTION OF THE DRAWINGS

FIGS. 2A, 2B, 2C, 2D, 2E, and 2F, collectively as shown in FIG. 2E, comprise an electrical schematic diagram of the present invention.

DESCRIPTION OF THE PREFERRED EMBODIMENT

Figure 1:
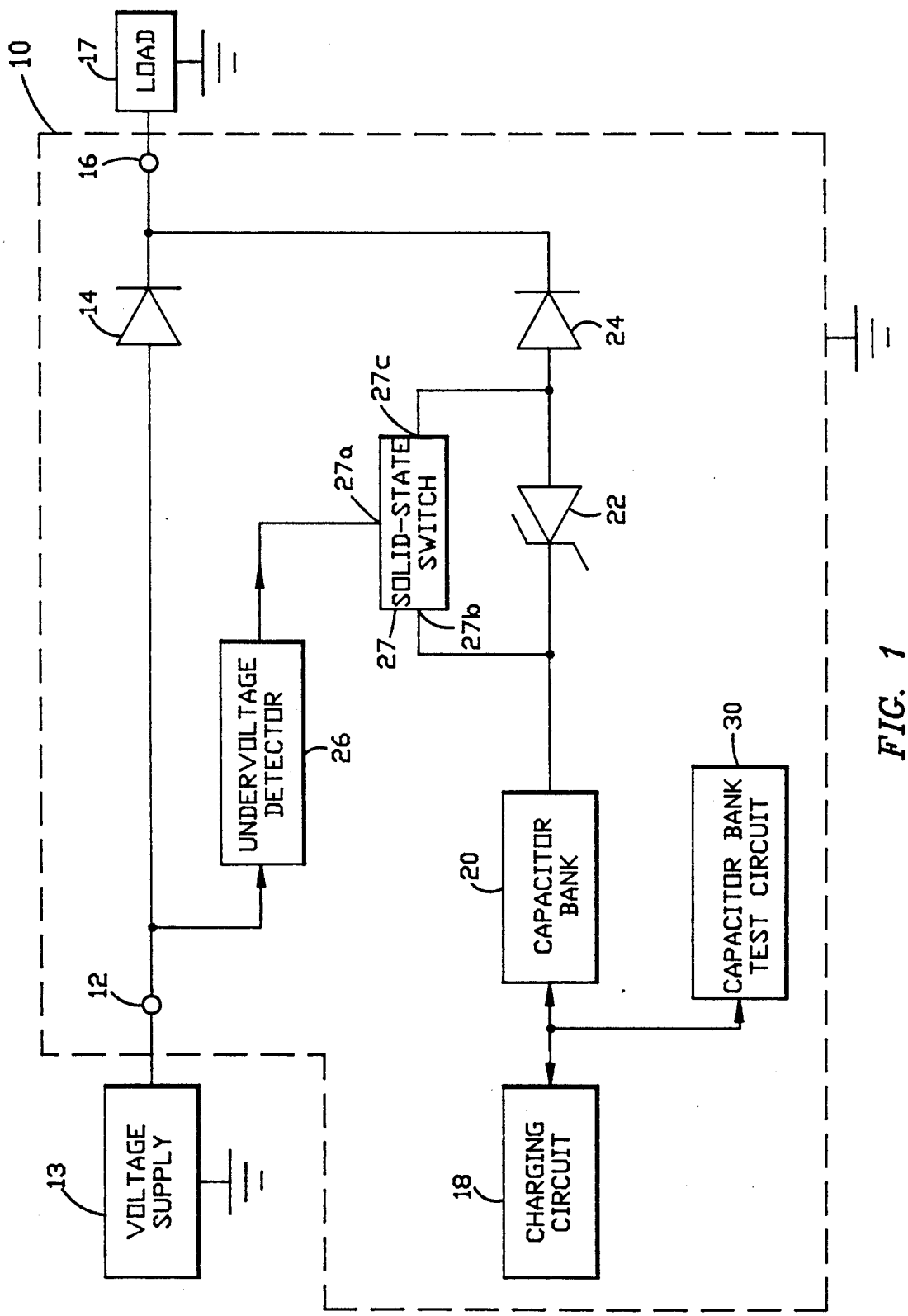
FIG. 1 is a block diagram of the present invention.

Referring to FIG. 1, there is illustrated power supply 10 comprising power input terminal 12 which receives electrical power from some power supply at a supply voltage, such as power supply 13. Diode 14 has an anode operably coupled to input terminal 12 and a cathode operably coupled to power output terminal 16. Electrical power is normally conducted through input terminal 12, diode 14, and output terminal 16 to load 17. Optional charging circuit 18 provides electrical power to capacitor bank 20. Capacitor bank 20 is charged to store a voltage having a predetermined potential which is at least as great, and preferably greater, than the supply voltage. Zener diode 22 has a cathode electrically connected to capacitor bank 20 and an anode operably coupled to the anode of diode 24. The cathode of diode 24 is operably connected between the cathode of diode 14 and output terminal 16. Undervoltage detector 26 senses the voltage between power input terminal 12 and the anode of diode 14 and provides an enabling output to enabling input 27a of solid-state switch 27 when the voltage potential at power input terminal 12 falls below a predetermined threshold level, as will be explained more fully herein. Input 27b of solid-state switch 27 is operably connected between capacitor bank 20 and the cathode of zener diode 22, as shown in FIG. 1. The output 27c of solid-state switch 27 is connected between and anodes of diodes 22 and 24. In the example of the preferred embodiment described herein, solid-state switch 27 is implemented as silicon controlled rectifier 28, as shown in FIG. 2. However, it is to be understood that the scope of the invention may include the implementation of solid state switching devices for solid-state switch 27 other than silicon controlled rectifiers, as for example, a MOSFET, bipolar transistor, MOS controlled thyrister (MCT), or gate turn-off thyrister (GTO). Application of these latter types of solid state switching devices to the present invention would be well within the level of ordinary skill of one practicing this art when taken in conjunction with these teachings.

Optionally, capacitor bank test circuit 30 is connected to sense the voltage of capacitor bank 20 and provides outputs that indicate the charge status of capacitor bank 20.

Briefly, in the operation of power supply 10, electrical power is provided by voltage supply 13 at design voltage through power input terminal 12, diode 14, and power output terminal 16 to load 17. The design voltage back biases diode 24. When the supply voltage drops below a predetermined level, the voltage stored in capacitor bank 20 overcomes the reverse bias voltage of zener diode 22 and is instantaneously conducted to load 17 through diode 24 and output terminal 16. Diode 14 isolates the voltage output of capacitor bank 20 from voltage supply 13. Undervoltage detector 26 senses the supply voltage, and when it drops below a second predetermined level, provides an output to the enabling input 27b of solid-state switch 27, triggering the latter into a state of conduction. The voltage output of capacitor 20 is then conducted to load 17 directly through solid-state switch 27, which is more energy efficient than reverse driving zener diode 22. Charging circuit 18 maintains the voltage stored in capacitor bank 20 between an upper and lower limit.

FIGS. 2A-2F collectively illustrate an example of the preferred embodiment of the present invention. Although part numbers and performance values for the various components are presented in FIGS. 2A-2F, they are given by way of example only. It is to be understood that the scope of the invention comprehends employment of components having performance values or part numbers other than those presented in FIGS. 2A-2F as well as modifications to the depicted circuitry FIGS. 2A-2F that would be obvious to one of ordinary skill in this art when taken in conjunction with these teachings.

Figure 2A:
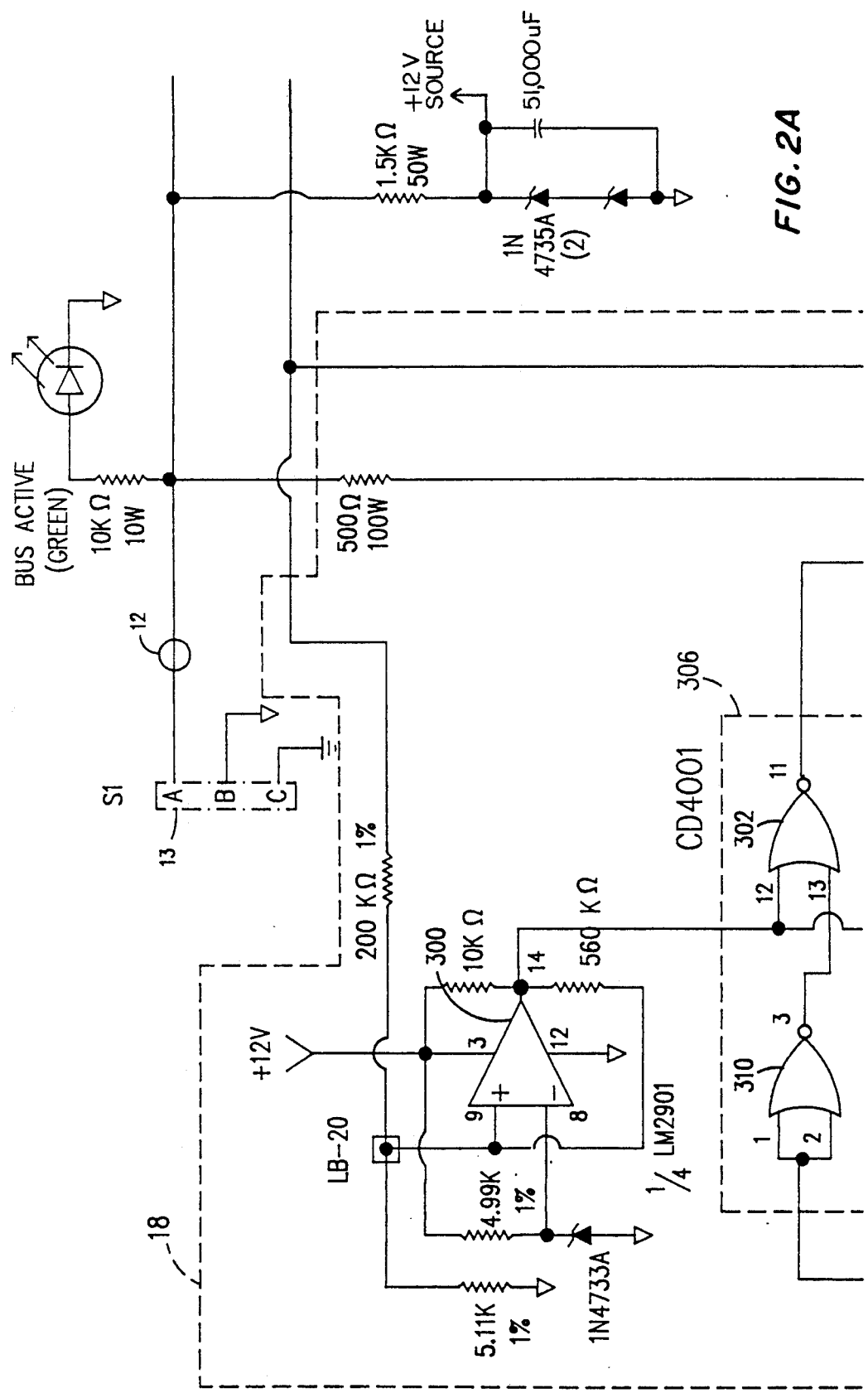
Figure 2B:
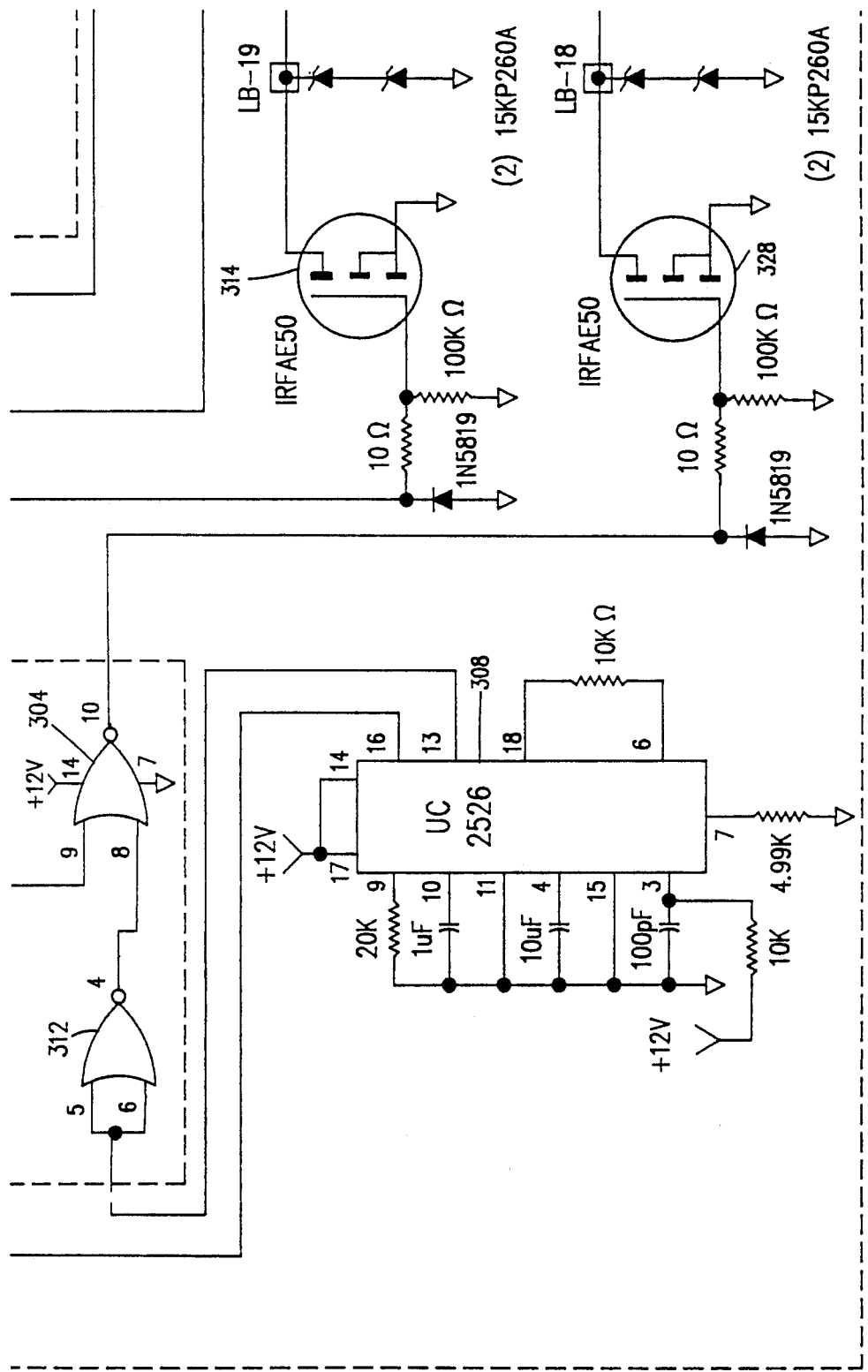
Figure 2C:
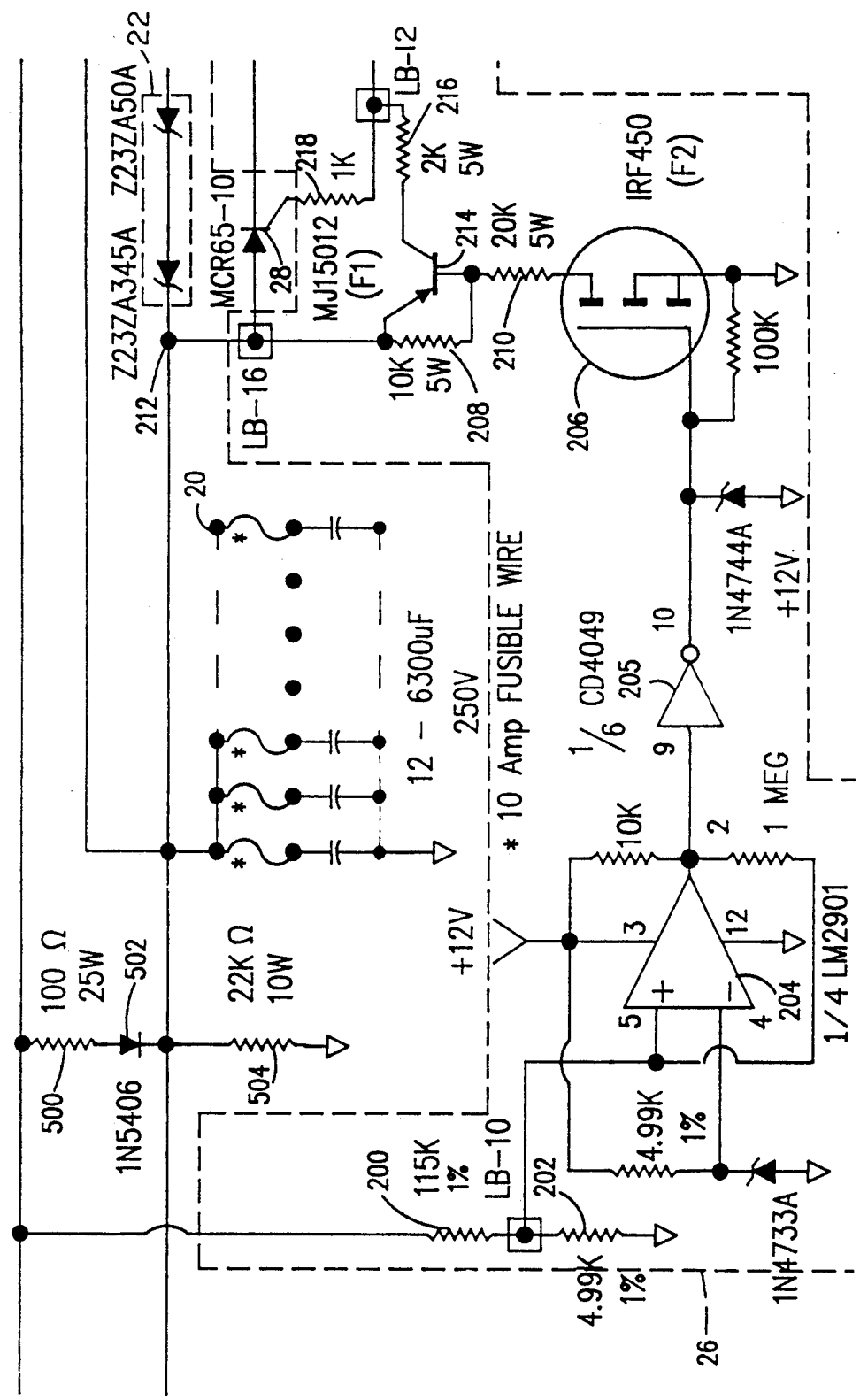

Referring to FIG. 2c, capacitor bank 20 is shown, by way of example, to consist of twelve 6300 μF electrolytic capacitors coupled in parallel. However, capacitor bank 20 may consist of any number of capacitors having other values of capacitance as would be suitable to satisfy the requirements of other particular applications.

Figure 2D:
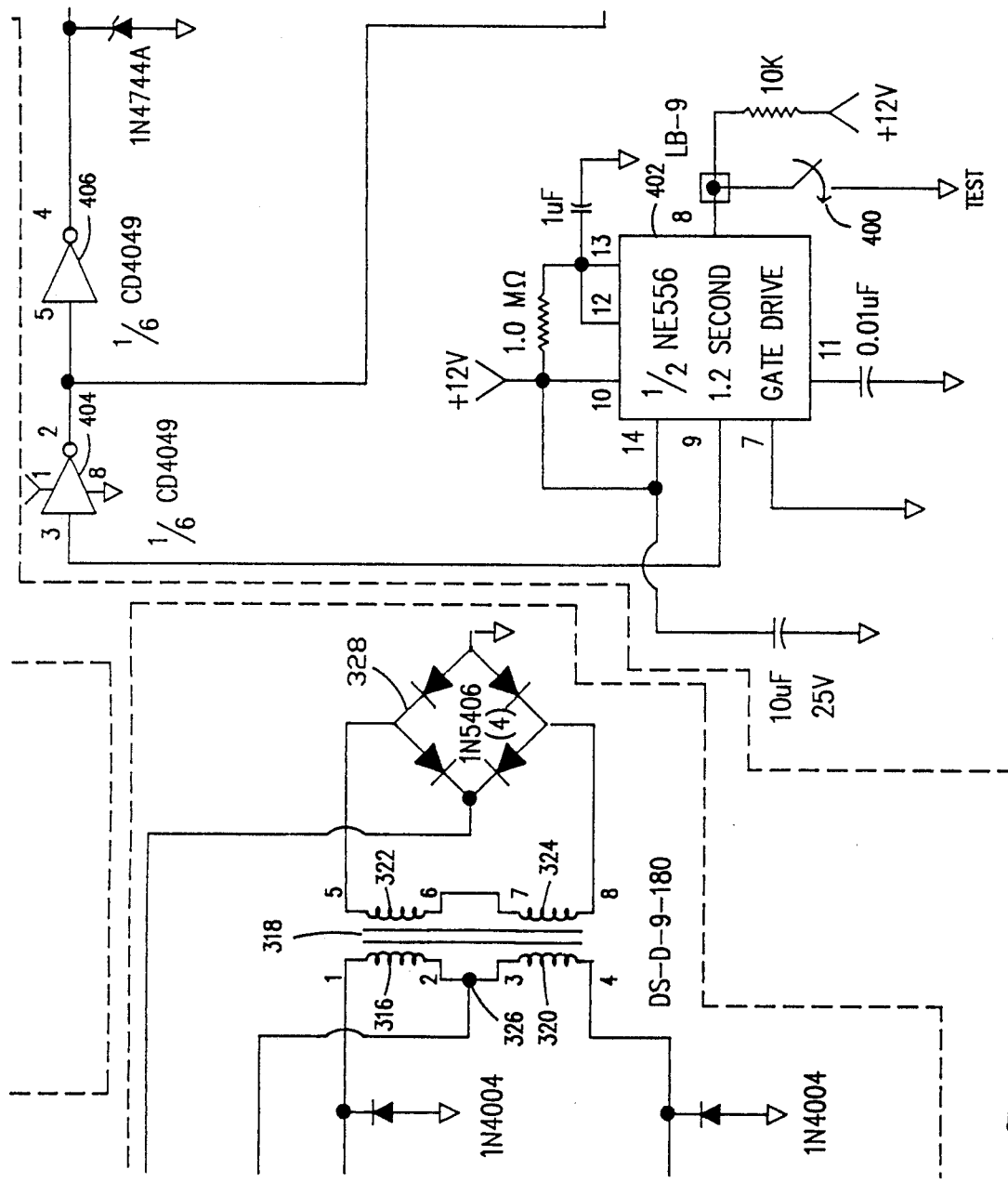

Undervoltage detector 26 is shown in FIGS. 2C and 2D to include a voltage divider consisting of resistors 200 and 202 through which the supply voltage is scaled and provided to the positive input of voltage comparator 204. The negative input of voltage comparator 204 receives a reference voltage so that when the scaled supply voltage drops below the reference voltage, the output of voltage comparator 204 changes state, which in the preferred embodiment, goes from a high logic level to a low logic level. The output of voltage comparator 204 is provided to invertor 205 so that when the output of voltage comparator 204 is low, the output of invertor 205, which is connected to the gate of FET 206, goes high, driving FET 206 into its on-state.

Still referring to FIGS. 2C and 2D, power resistor 210 is connected between the drain of FET 206 and the base of transistor 214. Power resistor 208 is connected between the emitter and base of transistor 214. The emitter of transistor 214 is connected to the anode of SCR 28. Resistor 216 is connected between the collector of transistor 214 and the cathode of SCR 28. The gate of SCR 28 is connected to the junction of resistors 216 and 218. When the output of invertor 205 is high, current is conducted through power resistors 208 and 210, and from the drain to source of FET 206 to ground. This causes transistor 214 to conduct whereby voltage is provided from the collector of transistor 214 through resistor 216 to the gate of SCR 28, causing SCR 28 to conduct. Capacitor bank 20 thereby conducts directly to load 17 through SCR 28 and diode 24.

Charging circuit 18 is described below with reference to FIGS. 2A, 2B, and 2D. Voltage comparator 300 has a positive input, which is connected to receive a scaled voltage from capacitor bank 20, and a negative input, which receives a reference voltage. The output of voltage comparator 300 is provided to an input of NOR gates 302 and 304 of QUAD-NOR gate 306, which also includes NOR gates 310 and 312. Oscillator 308 provides out-of-phase pulse trains to the inputs of NOR gates 310 and 312. NOR gates 310 and 312 invert the clock signals from oscillator 308. The outputs of NOR gates 310 and 312 are directed to one of the inputs of NOR gates 302 and 304, respectively, as shown. The output of NOR gate 302 is coupled to the gate of FET 314. FET 314 has a source connected to the power ground and a drain connected to primary winding 316 of transformer 318. Transformer 318 also includes primary winding 320 and secondary windings 322 and 324 which are connected together. Primary windings 318 and 320 are connected to centertap 326 which is operably coupled to the supply voltage, as shown. The output of NOR gate 304 is connected to the gate of FET 328. FET 328 has a source coupled to power ground and a drain connected to primary winding 320. The outputs of secondary windings 322 and 324 are connected to full wave bridge rectifier 328 which has an output connected to capacitor bank 20.

Still referring to FIGS. 2A, 2B, and 2B, the operation of charging circuit 18 is described as follows: When the scaled voltage of capacitor bank 20, as detected by the positive input of voltage comparator 300, drops below the reference voltage provided to the negative input of voltage comparator 300, the output of comparator 300 changes state from "high" to "low." Oscillator 308 continuously provides time differentiated clock pulse trains to the inputs of NOR gates 310 and 312, respectively, so that the inverted clock pulse trains appear at the outputs of NOR gates 310 and 312. If the output of comparator 300 is high, the outputs of NOR gates 302 and 304 will be clamped to a low logic level, inhibiting clock switching action in FET's 314 and 328. If the output of comparator 300 is low, the clock pulse train which is present at the output of NOR gate 310, and is being applied to the input of NOR gate 302, will be present at the output of NOR gate 302. This clock pulse train will enable the gate of FET 314 so that FET 314 conducts. When this occurs, a pulse train of current at the supply voltage, having the same frequency as the clock pulse train output from pin 16 of oscillator 308, will flow through primary winding 316 of transformer 318, and through FET 314 to power ground. A stepped-up voltage is induced in secondary windings 322 and 324 of transformer 318. Similarly, if the output of comparator 300 is low, the clock pulse train which is present at the output of NOR gate 312, and which is being applied to the input of NOR gate 304 will be present at the output of NOR gate 304 and will have undergone a second inversion. This clock pulse train will enable the gate of FET 328, and thus enable FET 328 to conduct. When this occurs, a pulse train of current at the supply voltage, having the same frequency as the clock pulse train output from pin 13 of oscillator 308, will flow through primary winding 320 of transformer 318, and through FET 328 to power ground. A stepped-up voltage is induced in secondary windings 322 and 324 of transformer 318. The direction of current flow in primary winding 316 of transformer 318 is opposite to the direction of current flow in primary winding 320, producing an alternating induced voltage in secondary windings 322 and 324. The alternating voltage induced in windings 322 and 324 is applied to full-wave bridge rectifier 328. The full wave rectified output of rectifier 328 is directed to capacitor bank 20 so that capacitor bank 20 may be recharged.

Figure 2F:
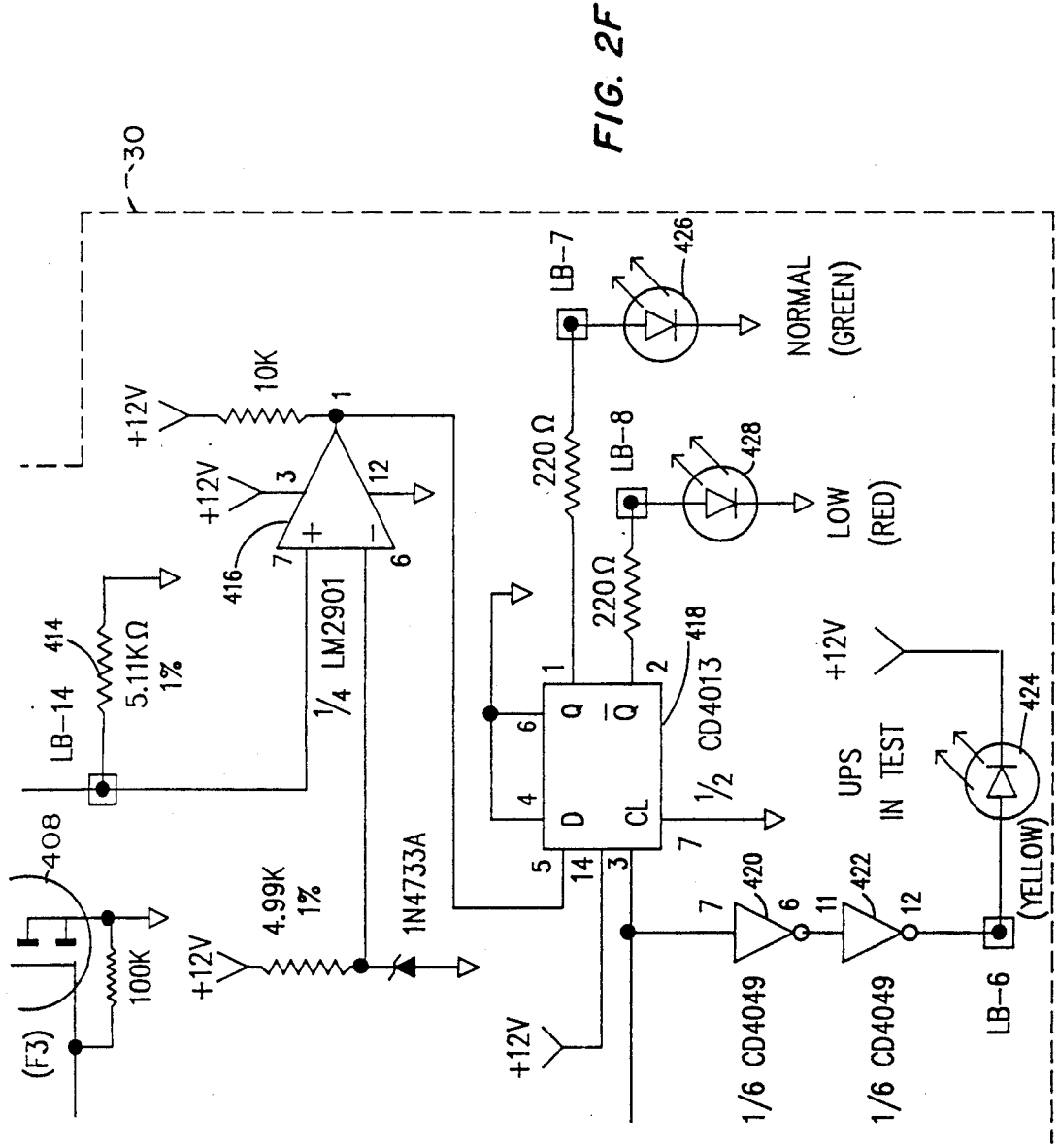

Capacitor bank test circuit, 30, which is optional, is described with reference to FIGS. 2D, 2E, and 2F, where there is shown normally-open switch 400 connected to pin 8 of gate drive 402. Actuation of switch 400 enables timer 402 which outputs a steady state signal from pin 9 for a predetermined period of time. The output of timer 400 is directed to serially connected inverters 404 and 406. The output of invertor 406 is operably coupled to the gate of FET 408. The drain of FET 408 is coupled to capacitor bank 20 through resistor 410. The voltage of capacitor bank 20 is connected through a voltage divider consisting of resistors 412 and 414 which provides a scaled capacitor voltage to the positive input of voltage comparator 416. The negative input of voltage comparator 416 receives a reference voltage. The output of voltage comparator 416 is directed to pin 5 of flip-flop 418. The output of invertor 404 is provided to pin 3 of flip-flop 418 and through serially connected inverters 420 and 422 to LED 424. The outputs of flip-flop 418 at pins 1 and 2 are connected to LED's 426 and 428, respectively.

The operation of capacitor bank test circuit 30 is described with reference to FIGS. 2D, 2E, and 2F. When it is desired to test the status of capacitor bank 20, switch 400 is manually engaged which results in timer 402 providing an output which is a timed pulse having a duration of 1.2 seconds, although other pulse periods may also be employed, depending on the particular application. The pulses are transmitted through inverters 404 and 406, providing a signal that energizes the gate of FET 408, causing capacitor bank 20 to discharge through resistor 410 and FET 408 to ground. As capacitor bank 20 is discharging, its voltage drops. Voltage comparator 416 detects the scaled voltage of capacitor bank 20. Capacitor bank test circuit 30 tests the ability of capacitor bank 20 to hold a charge by detecting the capacitor voltage after capacitor 20 discharges for a period of time, previously described as being 1.2 seconds in duration, through a predetermined load. If the capacitor bank voltage drops below a predetermined value within this period, voltage comparator 416 provides an output to flip-flop 418 which, in turn, energizes LED 428. Illumination of LED 428 indicates a low voltage condition of capacitor bank 20. If the scaled voltage of capacitor bank 20, detected during the period of the pulsed output of timer 402, is greater than the predetermined value, flip-flop 418 energizes LED 426, indicating satisfactory charge of capacitor bank 20. During the entire period when timer 402 provides the pulsed output, LED 424 is energized in order to indicate that capacitor bank 20 is being tested to determine its charge capacity.

Resistor 500 and diode 502 are operably coupled in series between power source 13 and capacitor 20 as shown in FIGS. 2A and 2C. These elements provide a means by which capacitor 20 may be very rapidly charged to power source voltage. Resistor 504 is coupled between capacitor 20 and ground in order to provide a means for bleeding voltage so that capacitor 20 does not overcharge. Alternatively, zener diodes, not shown, could be used in place of resistor 504.

Many modifications and variations of the present invention are possible in light of the above teachings. Therefore, it is to be understood that within the scope of the appended claims, the invention may be practiced otherwise than as specifically described.

We claim:

1. A direct current power supply for providing electrical energy during momentary power interruptions between a load and an electrical power source having a supply voltage, comprising:
   a capacitor having an initial voltage charge at least as great as said supply voltage;
   a first zener diode having a cathode operably coupled to said capacitor and an anode;
   a first diode having an anode operably coupled to said anode of said first zener diode, and a cathode;
   a solid state switch having a power input operably coupled between said capacitor and said cathode of said first zener diode, a power output operably coupled between said anode of said first zener diode and said anode of said first diode, an enabling input which when triggered by an enabling signal, causes said solid state switch to conduct electricity from said power input to said power output;
   a second diode having an anode and a cathode operably coupled to said cathode of said first diode; and
   enabling means operably coupled between said enabling input of said solid state switch and said anode of said second diode for providing said enabling signal to said enabling input of said solid state switch when said supply voltage is below a predetermined supply voltage level.

2. The power supply of claim 1 wherein:
   said solid state switch is a thyristor.

3. The power supply of claim 2 wherein:
   said thyristor is a silicon controlled rectifier having a cathode operably coupled between said anodes of said first zener diode and said first diode, an anode operably coupled between said capacitor and said cathode of said first zener diode, and a gate for receiving said enabling signal.

4. The power supply of claim 3 wherein said enabling means includes:
   a gate triggering circuit for providing said enabling signal to said gate of said silicon controlled rectifier.

5. The power supply of claim 4 wherein said enabling means further includes:
   a field effect transistor having a source operably connected to a ground, a drain, and a gate;
   a PNP transistor having a base operably coupled to said drain of said field effect transistor, a collector operably coupled to said gate of said silicon controlled rectifier, and an emitter operably coupled to said anode of said silicon controlled rectifier;
   a voltage comparator operably coupled to said supply voltage and having a first input functionally related to said supply voltage, a second input corresponding to a reference voltage, and an output operably coupled to said gate of said field effect transistor, said output changing state when said first input becomes less than said second input.

6. The power supply of claim 5 wherein said enabling means further includes:
a first resistor operably coupled between said gate of said silicon controlled rectifier and said collector of said PNP transistor for limiting current to said gate.

7. The power supply of claim 6 wherein said enabling means further includes:
a second resistor operably coupled between said emitter and said base of said PNP transistor.

8. The power supply of claim 7 wherein said enabling means further includes:
a third resistor operably coupled in series between said base of said PNP transistor and said drain of said field effect transistor.

9. The power supply of claim 8 wherein said enabling means further includes:
an inverter operably coupled between said output of said voltage comparator and said gate of said field effect transistor.

10. The power supply of claim 9 which further includes:
means for limiting said charge of said capacitor.

11. The power supply of claim 10 wherein said charge limiting means includes:
a fourth resistor operably coupled between said supply voltage and said capacitor; and
a third diode operably coupled in series between said third resistor and said capacitor; and
a fifth resistor operably coupled between said capacitor and said ground.

12. The power supply of claim 11 which further includes:
a charging circuit operably coupled to said capacitor to detect said charge of said capacitor and to recharge said capacitor when said detected charge is below a predetermined voltage charge level.

13. The power supply of claim 11 which further includes:
test means operably coupled to said capacitor for providing an output corresponding to a level of said voltage charge of said capacitor detected while said capacitor is discharged through a predetermined resistive load for a predetermined period of time.

14. The power supply of claim 1 wherein said enabling means includes:
a gate triggering circuit for providing said enabling signal to said enabling input of said solid state switch.

15. The power supply of claim 14 wherein said enabling means further includes:
a field effect transistor having a source operably connected to a ground, a drain, and a gate;
a PNP transistor having a base operably coupled to said drain of said field effect transistor, a collector operably coupled to said gate of said silicon controlled rectifier, and an emitter operably coupled to said anode of said silicon controlled rectifier;
a voltage comparator operably coupled to said supply voltage and having a first input functionally related to said supply voltage, a second input corresponding to a reference voltage, and an output operably coupled to said gate of said field effect transistor, said output changing state when said first input becomes less than said second input.

16. The power supply of claim 15 wherein said enabling means further includes:
a first resistor operably coupled between said enabling input of said solid state switch and said collector of said PNP transistor for limiting current to solid state switch.

17. The power supply of claim 16 wherein said enabling means further includes:
a second resistor operably coupled between said emitter and said base of said PNP transistor.

18. The power supply of claim 17 wherein said enabling means further includes:
a third resistor operably coupled in series between said base of said PNP transistor and said drain of said field effect transistor.

19. The power supply of claim 18 wherein said enabling means further includes:
an inverter operably coupled between said output of said voltage comparator and said gate of said field effect transistor.

20. The power supply of claim 19 which further includes:
means for limiting said charge of said capacitor.

21. The power supply of claim 20 wherein said charge limiting means includes:
a fourth resistor operably coupled between said supply voltage and said capacitor; and
a third diode operably coupled in series between said third resistor and said capacitor; and
a fifth resistor operably coupled between said capacitor and said ground.

22. The power supply of claim 21 which further includes:
a charging circuit operably coupled to said capacitor to detect said charge of said capacitor and to recharge said capacitor when said detected charge is below a predetermined voltage charge level.

23. The power supply of claim 21 which further includes:
test means operably coupled to said capacitor for providing an output corresponding to a level of said voltage charge of said capacitor detected while said capacitor is discharged through a predetermined resistive load for a predetermined period of time.

* * * * *